(12) United States Patent
Cheung et al.

(10) Patent No.: US 8,068,304 B1
(45) Date of Patent: Nov. 29, 2011

(54) CALIBRATING SERVOS

(75) Inventors: Man Cheung, Campbell, CA (US);
David Rutherford, San Jose, CA (US);
Jerry Richgels, San Jose, CA (US);
Perry Neos, Los Altos, CA (US)

(73) Assignee: Marvell International Ltd., Hamilton (BM)

( * ) Notice: Subject to any disclaimer, the term of this patent is extended or adjusted under 35 U.S.C. 154(b) by 303 days.

(21) Appl. No.: 12/192,977

(22) Filed: Aug. 15, 2008

Related U.S. Application Data

(60) Provisional application No. 60/955,990, filed on Aug. 15, 2007.

(51) Int. Cl.
*G11B 5/09* (2006.01)

(52) U.S. Cl. .......................................... 360/51; 360/75

(58) Field of Classification Search .................. None
See application file for complete search history.

(56) References Cited

U.S. PATENT DOCUMENTS

| | | | |
|---|---|---|---|
| 5,668,679 A * | 9/1997 | Swearingen et al. .......... 360/75 |
| 6,967,799 B1 * | 11/2005 | Lee ................................. 360/51 |
| 6,987,636 B1 | 1/2006 | Chue et al. |
| 6,992,852 B1 | 1/2006 | Ying et al. |
| 7,019,937 B1 | 3/2006 | Liikanen et al. |
| 7,068,459 B1 | 6/2006 | Cloke et al. |
| 7,088,533 B1 | 8/2006 | Shepherd et al. |
| 7,113,362 B1 | 9/2006 | Lee et al. |
| 7,158,336 B2 * | 1/2007 | Chan et al. ................ 360/77.05 |
| 7,167,333 B1 | 1/2007 | Liikanen et al. |
| 7,209,312 B1 | 4/2007 | Sutardja |
| 7,212,364 B1 * | 5/2007 | Lee ................................. 360/51 |
| 7,248,427 B1 | 7/2007 | Everett et al. |
| 7,411,758 B1 * | 8/2008 | Cheung et al. ................. 360/75 |
| 7,414,809 B2 * | 8/2008 | Smith et al. ................ 360/77.08 |
| 7,471,481 B2 * | 12/2008 | Lau et al. ......................... 360/75 |
| 2007/0253084 A1 * | 11/2007 | Annampedu et al. .......... 360/39 |

OTHER PUBLICATIONS

U.S. Appl. No. 12/192,984, filed Aug. 15, 2008, to be published by the USPTO, application as filed, 40 pages.

* cited by examiner

*Primary Examiner* — Jason Olson

(57) ABSTRACT

Methods, systems, and apparatus, including computer program products are described for calibrating servos, and in some implementations, calibrating spiral servos for use in self-servo-write (SSW) processes. In one aspect, a method is provided that includes determining timing reference information on a machine readable medium, locking a clock signal to the timing reference information, detecting a spiral on the machine readable medium, determining a location of the spiral using the clock signal, and calibrating a spiral servo according to the location of the spiral.

15 Claims, 15 Drawing Sheets

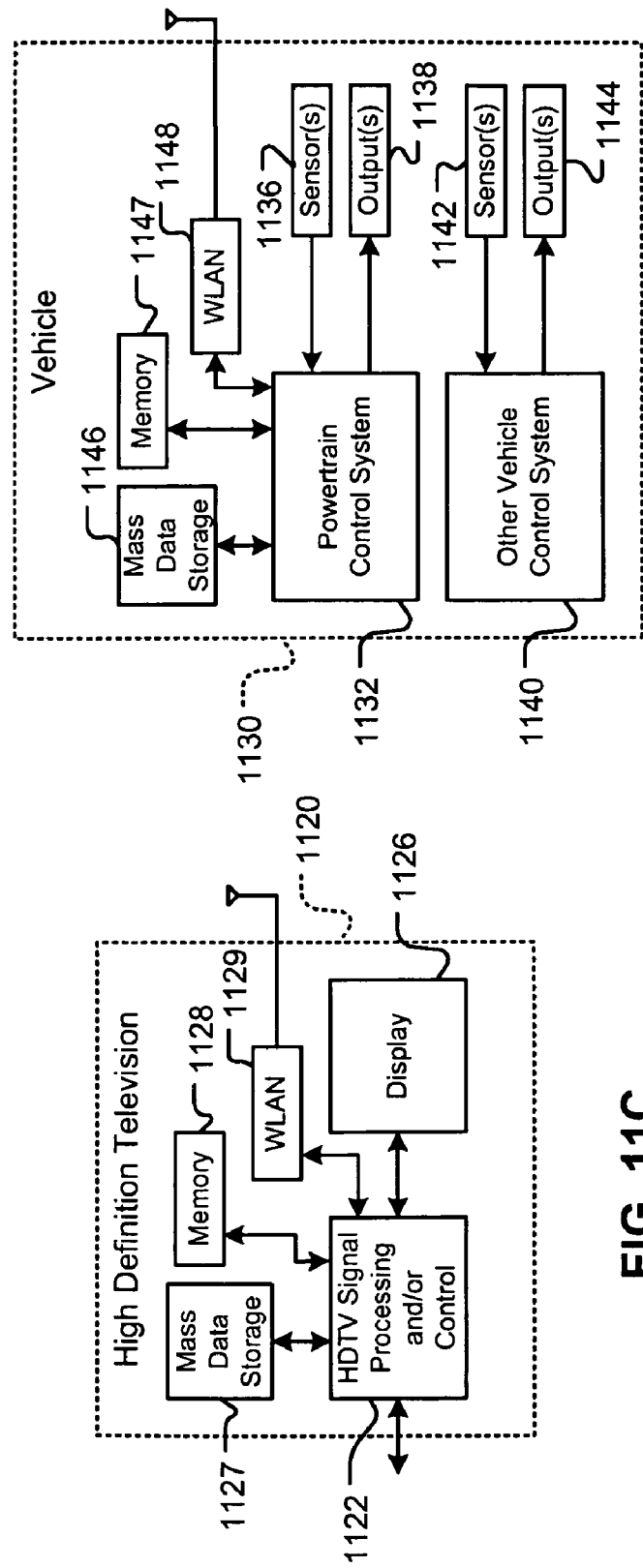

CALIBRATING SERVOS

CROSS-REFERENCE TO RELATED APPLICATIONS

This application claims priority to U.S. Provisional Application Ser. No. 60/955,990, for "Methods to Sync Up Spiral Servo in SSW," filed on Aug. 15, 2007, which is incorporated by reference herein in its entirety.

TECHNICAL FIELD

The subject matter of this patent application relates to servos.

BACKGROUND

In magnetic-medium-based storage devices, data can be stored on circular, concentric tracks on a magnetic disk surface. A read/write head can retrieve and record data on a magnetic layer of a rotating disk as the head flies on a cushion of air over the disk surface. When retrieving data, magnetic field variations can be converted into an analog electrical signal, which can then be amplified and converted to a digital signal for signal processing. To guarantee the quality of the information stored on and read back from the disk, the read/write head needs to be precisely positioned at substantially the center of a track during both writing and reading. A closed-loop servo system, driven by servo information embedded in a dedicated portion of the track, can be used as a reference for positioning the head.

The servo information generally defines the position of the data tracks and is generally written with great accuracy to ensure that the head servo system operates properly. The servo information can be written on each surface as a radially extending set of spokes or wedges. The portion of a servo wedge at a particular track location may contain a sync field, and index mark, a gray coded track number, and two or more fine-positioned offset bursts configured in an echelon across the track. Head positioning relative to a track center can be determined and corrected, if necessary, by reading and noting the respective amplitudes and timings of the offset bursts.

A servo writer (e.g., a servo track writer (STW)) can be used to write the embedded servo information on the disk surface. A servo writer can include a large base (e.g., granite base) to minimize the effects of vibration. The servo writer also may use precision fixtures to hold the target drive, a precision, laser-interferometer-based actuator arm positioning mechanism to place the arms radially with respect to the axis of rotation of the disks in the drive, and an external clock head to position the servo wedges in time. Conventional servo writers are typically large in size and expensive to be manufactured. Further, as track density increases, the servo writing time required to write the servo information also increases, which can create a bottleneck in the disk drive manufacturing process.

Instead of using a STW to write a full set of servo tracks on a machine readable medium, a small band of seed tracks (e.g., two hundred servo tracks) can be written to facilitate a self-servo-write (SSW) process. A SSW process uses the same heads (e.g., read/write heads) that are used to read/write data to write servo sectors. Alternatively, or in addition, spirals can be written, without using a STW, to facilitate a self-servo-write process.

SUMMARY

Methods, systems, and apparatus, including computer program products, are described for calibrating servos, specifically calibrating spiral servos for use in SSW processes.

In one aspect, an apparatus is provided that includes a timing reference detector that detects a seed track on a machine readable medium, the seed track including a timing mark; a clock generator that generates a clock signal and locks the clock signal to the timing mark of the seed track; and a servo track window period generator that generates a spiral window to determine a relative location of a spiral on the machine readable medium from a location of the seed track. Other embodiments of this aspect include corresponding systems, methods, and computer program products.

One or more implementations can optionally include one or more of the following features. The apparatus can further include a servo track detector that locates the spiral using the spiral window. The servo track detector can include a comparison module that determines the relative location of the spiral on the machine readable medium from the location of the seed track. The servo track window period generator can include a calibration module that calibrates a location of the spiral window. The apparatus can further include a servo track generator that generates servo information using the spiral, the servo information being used to write servo tracks.

In another aspect, a method is provided that includes determining timing reference information on a machine readable medium, locking a clock signal to the timing reference information, detecting a spiral on the machine readable medium, determining a location of the spiral using the clock signal, and calibrating a spiral servo according to the location of the spiral. Other embodiments of this aspect include corresponding systems, apparatus, and computer program products.

One or more implementations can optionally include one or more of the following features. The timing reference information can be determined from a timing mark of a seed track. Determining the location of the spiral can include determining a location of the seed track using data from the seed track, and determining a relative location of the spiral from the location of the seed track. The seed track can be previously written using a servo track writer. The seed track can be previously written using a self-servo-write process. The method can further include switching control for tracking from a servo wedge servo to the spiral servo. The method can further include writing servo tracks using the spiral servo.

In another aspect, a system is provided that includes a machine readable medium, and a servo controller. The servo controller includes a timing reference detector that detects a seed track on the machine readable medium, the seed track including a timing mark, a clock generator that generates a clock signal and locks the clock signal to the timing mark of the seed track, and a servo track window period generator that generates a spiral window to determine a relative location of a spiral on the machine readable medium from a location of the seed track. Other embodiments of this aspect include corresponding methods, apparatus, and computer program products.

One or more implementations can optionally include one or more of the following features. The servo controller can further include a servo track detector that locates the spiral using the spiral window. The servo track detector can include a comparison module that determines the relative location of the spiral on the machine readable medium from the location of the seed track. The servo track window period generator can include a calibration module that calibrates a location of the spiral window. The servo controller can further include a servo track generator that generates servo information using the spiral, the servo information being used to write servo tracks.

Particular embodiments of the subject matter described in this specification can be implemented to realize none, one or more of the following advantages. Calibrating servos to track follow spirals enables the use of SSW processes, thereby reducing the use of STWs for writing servo tracks and reducing costs associated with the use of STWs (e.g., monetary costs, and time), and eliminating the intrusive nature of STW processes (e.g., creating an opening in a hard disk drive for an external device to control an actuator arm).

The details of one or more embodiments of the invention are set forth in the accompanying drawings and the description below. Other features and advantages of the invention will be apparent from the description and drawings, and from the claims.

DESCRIPTION OF DRAWINGS

FIGS. 11A-11G show various example implementations of the described systems and techniques.

DETAILED DESCRIPTION

Figure 1A:
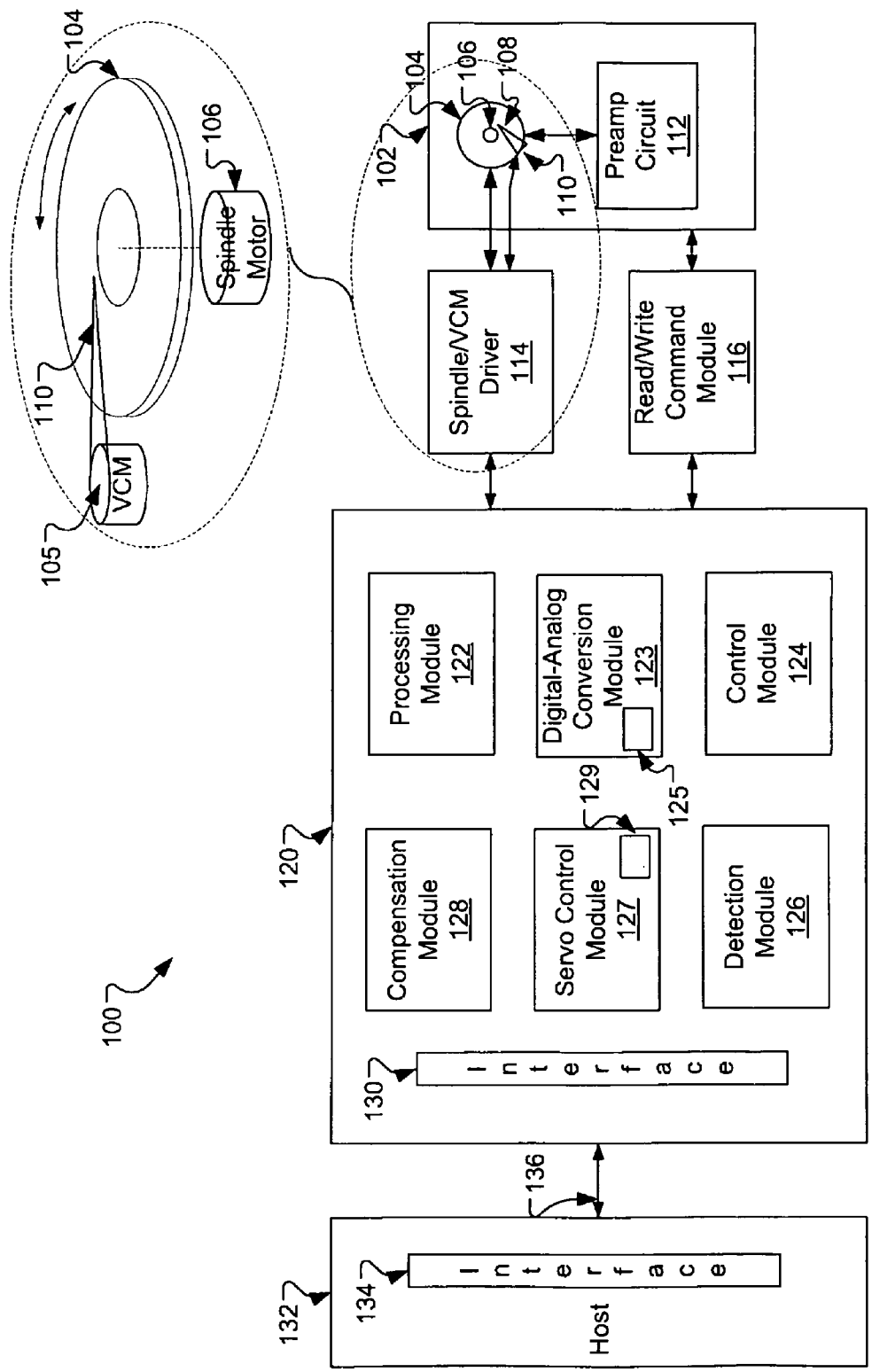
FIG. 1A is a conceptual block diagram of an example hard disk drive system.

FIG. 1A is a conceptual block diagram of an example hard disk drive (HDD) system 100. As shown in FIG. 1A, the HDD system 100 includes a printed circuit board (PCB) 120. The PCB 120 includes a processing module 122, a digital-analog conversion module 123 having a digital-analog converter 125, a control module 124, a detection module 126, a servo control module 127, a compensation module 128 and a communications interface 130, each of which is connected through one or more internal buses (not shown).

The processing module 122 can perform data and/or control processing related to the general operation of the HDD system 100. For example, the processing module 122 can execute instructions received from the control module 124 to control disk drive functions. These functions can include, for example, reading and decoding host commands, starting up and controlling the speed of the spindle motor 106, minimizing head positioning servo off track error through the control of the voice coil motor (VCM) 105, and managing power consumption of the HDD system 100.

The processing module 122 can include volatile memory (e.g., SDRAM or other types of low latency memory) for storing, for example, volatile control data associated with the control of the HDD system 100, and non-volatile memory (e.g., flash memory) for storing, for example, critical data such as non-volatile control code. The control data and control code can include instructions that the processing module 122 executes or utilizes, as well as tables, parameters, or arguments used during the execution of these instructions. In some implementations, the processing module 122 also can store various firmware routines for controlling the operation of the spindle motor 106 such as, without limitation, startup routines, speed control routines, spin down routines and parking routines.

The processing module 122 can include registers and buffers for storing, for example, flags indicating whether a spin-up operation has been successfully completed. Alternatively, the flags can be stored in a register defined by a memory location in a memory unit separate from the processing module 122.

In some implementations, the processing module 122 can include a pulse width modulation (PWM) controller (not shown) for generating control signals so as to control the spindle/VCM driver 114 to drive the spindle motor 106 at a substantially constant speed while the disk drive is in use. The spindle/VCM driver 114 can receive VCM control signals from the PWM controller and generate a corresponding command signal to command the VCM 105 for positioning the actuator arm 110 and the read/write head 108, for example, as part of a parking operation. The VCM 105 can be controlled by the servo control module 127, and can be configured to apply torque to the read/write head 108 to swing the read/write head 108 during, for example, a track-seeking operation and to maintain the head 108 at a desired angular position during a track-following operation.

The spindle/VCM driver 114 can, in some implementations, include an electromotive force (EMF) detector (not shown) for detecting a back electromotive force (BEMF) associated with one or more windings of the spindle motor. The control module 124 can communicate with the spindle/VCM driver 114, for example, to receive zero crossing information to be used for identifying the instant at which a zero crossing occurs (e.g., a zero crossing in the BEMF induced in a floating winding), and for determining a spin-rate of the spindle motor. As an example, while the spindle motor 106 is rotating, the EMF detector can detect the BEMF zero crossing point for an un-driven winding to generate a zero crossing signal (e.g., by counting clock pulses and determining time elapsed between the consecutive detected zero crossings). The control module 124 can receive the zero crossing signal and provide information associated with the zero crossing signal to the processing module 122, for example, to compute the velocity of the spindle motor 106.

The control module 124 can function to manage and handle data transfer between the PCB 120 and the host 132 during read and write operations through the communications interfaces 130/134. The control module 124 also can include servo logic for managing the positioning of the read/write head 108 when seeking (e.g., moving from one track to a non-adjacent track) and during tracking (e.g., staying on a single track).

The control module 124 can communicate with the communications interface (e.g., an input/output interface) 130 and with the spindle/VCM driver 114 or the read/write command module 116. The control module 124 can coordinate control of the spindle/VCM driver 114, the read/write command module 116, the processing module 122, the compensation module 128 and the detection module 126.

The control module 124 can receive a command from the host computer 132 to generate a spin-up command while the spindle motor 106 is at rest to begin the spin-up mode of operation. The processing module 122 can receive the spin-up command from the control module 124 and retrieve an associated control routine for the spin-up mode of operation from a memory unit.

During write operations, the read/write command module 116 can encode (e.g., using run length limited coding (RLL)) data to be written by the read/write head 108 and generate encoded write signals. The read/write command module 116 also can process the write signals providing a reliability check and can apply, for example, error correction coding (ECC) and similar algorithms to allow for the verification of the integrity of the data that is written. During read operations, the read/write head 108 can generate read signals (e.g., analog signals), and the read/write command module 116 can convert the analog read signals into digital read signals. The converted signals can be detected and decoded by conventional techniques to recover data written by the read/write head 108.

Signals between the HDD head assembly 102 and the PCB 120 can be carried, for example, through a flexible printed cable. The HDD head assembly 102 can include one or more magnetic disks or platters 104 for storing magnetic data. The platters 104 can be rotated by the spindle motor 106. The spindle motor 106 can rotate the magnetic platters 104 at a controlled speed during the read/write operations. The read/write actuator arm 110 can move relative to the magnetic platters 104 in order to read and/or write data to/from the magnetic platters 104. The spindle/VCM driver 114 can be configured to control the spindle motor 106, which rotates the magnetic platters 104. If desired, the spindle/VCM driver 114 also can generate control signals for positioning the read/write actuator arm 110 using the voice coil actuator 105, a stepper motor or any other suitable actuator.

The read/write head 108 can be located near a distal end of the read/write actuator arm 110. The read/write head 108 can include a write element (e.g., an inductor) that generates a magnetic field, and a read element (e.g., a magneto-resistive (MR) element) that senses the magnetic field on the magnetic platters 102.

The HDD head assembly 102 also can include a preamp circuit 112. The preamp circuit 112 can operate either in a read mode or write mode, and can communicate with one or more transducers (not shown). A transducer can generate a low level analog read signal, and send the analog read signal to the preamp circuit 112 to produce an amplified read signal. During a user-data read operation, the amplified read signal serially defines the servo information and user data. The servo information can include positioning data information such as track identification data information and fine positioning information. During a write operation, the preamp circuit 112 also can provide write current via a write data signal to a selected transducer for writing a sequence of symbols onto the magnetic platters 104. The write current changes polarity upon each change in the binary value of the write data signal.

In some implementations, portions of the HDD system 100 can be implemented as one or more integrated circuits (IC) or chips. For example, the processing module 122 and the control module 124 can be implemented in a single chip. As another example, the spindle/VCM driver 114 and the read/write command module 116 can be implemented in a same (or different) chip as the processing module 122 and the control module 124. As yet another example, the HDD system 100 other than the HDD head assembly 102 can be implemented as a system-on-chip.

In general, the spindle motor 106 can have different power requirements based on different operational configurations. For example, initial acceleration (e.g., during spin-up process) of the spindle motor 106 can require a high value of current relative to operation at steady-state velocity. As the spindle motor 106 reaches a desired operating velocity, the average motor current requirement can decrease substantially to maintain the head at a desired track.

Information can be stored on each platter 104 in concentric tracks. Data tracks can be divided into sectors. Information can be written to and/or read from a storage surface(s) of a disk by the read/write head 108. The read/write head 108 can be mounted on the actuator arm 110 capable of moving the read/write head 108, e.g., radially over the platter 104. The movement of the actuator arm 110 can allow the read/write head 108 to access different data tracks. The platters 104 can be rotated by the spindle motor 106 at a relatively high speed. The read/write head 108 can access different sectors within each track on the platter 104.

Operation of the actuator arm 110 can be controlled by the servo control module 127. The servo control module 127 can move the read/write head 108 according to two primary operations: seek control operation and track following operation.

In a seek control operation, the servo control module 127 controls the actuator arm 110 such that the read/write head 108 can be transitioned from an initial position to a target track position for which the host 132 has requested. A seek control operation generally includes accelerating, decelerating and settling the VCM 105 at a predetermined speed. In general, the servo control module 127 can initiate a seek control operation when the host 132 issues, for example, a seek command to read data from or write data to a target track on the platters 104.

As the read/write head 108 approaches a target track, the servo control module 127 can settle the actuator arm 110. During settling, the servo control module 127 can bring the head 108 to rest over a target track within a selected settle threshold or window, which can be based on a percentage of the track width from the center of the track. The servo control module 127 can employ, for example, a pre-loaded algorithm, to ensure that the head 108 is positioned on the target track with sufficient accuracy to write (and read). This process can require counting servo position samples occurring within the settle window. For example, a write operation can be initiated after observing one or more consecutive positioning samples that are within certain areas of a data track. A wide variety of settle criteria can be employed, in ensuring positioning accuracy.

After the head 108 is settled over a desired track, the servo control module 127 can initiate a track following mode. In the track following mode, the head 108 can be positioned and maintained at a desired position with respect to the target track (e.g., over a centerline of the track) or over a defined radial location along a track on the disk until desired data transfers are complete and another seek is performed.

The digital-analog conversion module 123, which includes a digital-analog converter 125, can operate to convert data between the digital form used by the PCB 120 and the analog form conducted through the head 108 in the HDD head assembly 102. The HDD head assembly 102 can provide servo position information read by the head 108 to the servo control module 127. Servo sectors on each of the platters 104 can include head location information, such as a track identification field and data block address, for identifying a target track and data block, and burst fields to provide servo fine location information. The head location information read by the head 108 can be converted from analog signals to digital data by the digital-analog converter 125, and fed to the servo control module 127. The servo positional information can be used to detect the location of the head 108 in relation to a target track or target data sectors on the platters 104. The servo control module 127 can utilize, for example, target data sectors and servo position information to precisely place the head 108 over the target track and data sector on the platters 104, and to continuously maintain the head 108 aligned with the target track while data is written/read to/from one or more identified data sectors.

The digital-analog conversion module 123 can include a digital-analog converter (DAC) 125 for converting control signals (e.g., for controlling the position of the head 108) generated by the control module 124 into analog signals (and from analog signals into digital data). For example, a head position signal can be generated by the control module 124 and provided to the DAC 125. The DAC 125 can convert the head position signal into an analog signal (e.g., a voltage signal) for driving the VCM 105 coupled to the actuator arm 110. The actuator arm 110 can subsequently move the head 108 along the surface of the platters 104 based on the analog signal provided by the DAC 125.

In some implementations, the DAC 125 can be configured to output, for example, different analog voltage ranges to account for resolution needs at different operating conditions. In these implementations, the DAC 125 can have one or more selectable modes. For example, the DAC 125 can utilize certain modes (i.e., referred to here as "higher modes") to provide a larger voltage range and bigger current scale but at a lower resolution (volts/digital count). In these implementations, higher modes can be used, for example, during seeking control operations where a large voltage range is generally desirable. Conversely, the DAC 125 can employ other modes (i.e., referred to here as "lower modes") to provide a higher resolution (e.g., smaller voltage steps per digital count). Lower modes can be used, for example, for track following operations where high resolution is critical to servo tracking performance.

In some implementations, the servo control module 127 can include a servo controller 129 to control mechanical operations related to servo processing, such as, but not limited to, head positioning (e.g., through the HDD head assembly 102) and rotational speed control (e.g., through the VCM 105).

Figure 1B:
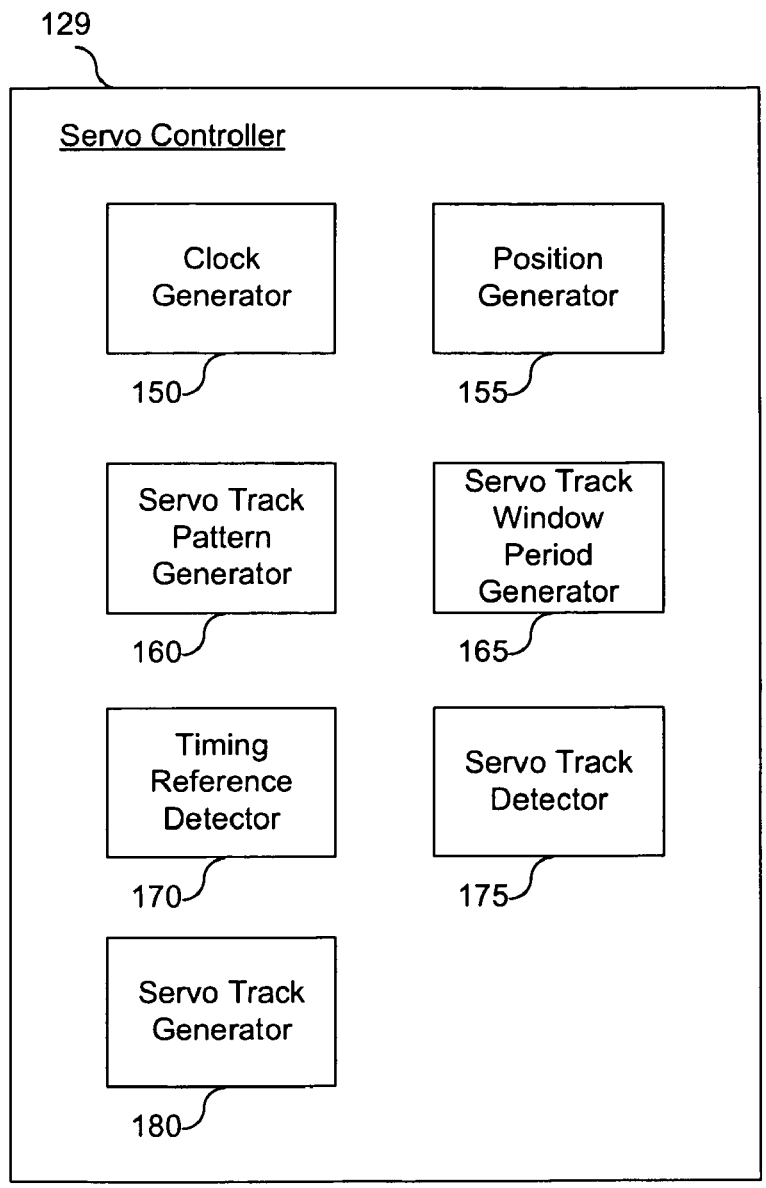
FIG. 1B is a conceptual block diagram of an example servo controller of FIG. 1A.

FIG. 1B is a conceptual block diagram of the example servo controller 129 (e.g., a SSW controller) of FIG. 1A. The servo controller 129 includes a clock generator 150, a position generator 155, a servo track pattern generator 160, and a servo track window period generator 165. The servo controller 129 can further include a timing reference detector 170, a servo track detector 175, and a servo track generator 180. In some implementations, the timing reference detector 170 can detect back electromotive force (BEMF) pulses associated with a motor rotating a machine readable medium (e.g., a blank disk rotating at a constant angular velocity). The BEMF pulses can be used as timing reference information. In addition, or alternatively, the timing reference detector 170 can detect timing tracks that have already been written on the machine readable medium (e.g., seed tracks with timing marks). The clock generator 150 can generate a signal that is locked to the velocity of the rotating machine readable medium. In some implementations, the servo track detector 175 can be used to locate a servo track (e.g., a spiral) using a spiral window generated by the servo track window period generator 165, for example. In some implementations, the servo track generator 180 can generate servo information using the spiral. The servo information can be used to write servo tracks on the machine readable medium.

Figure 2:
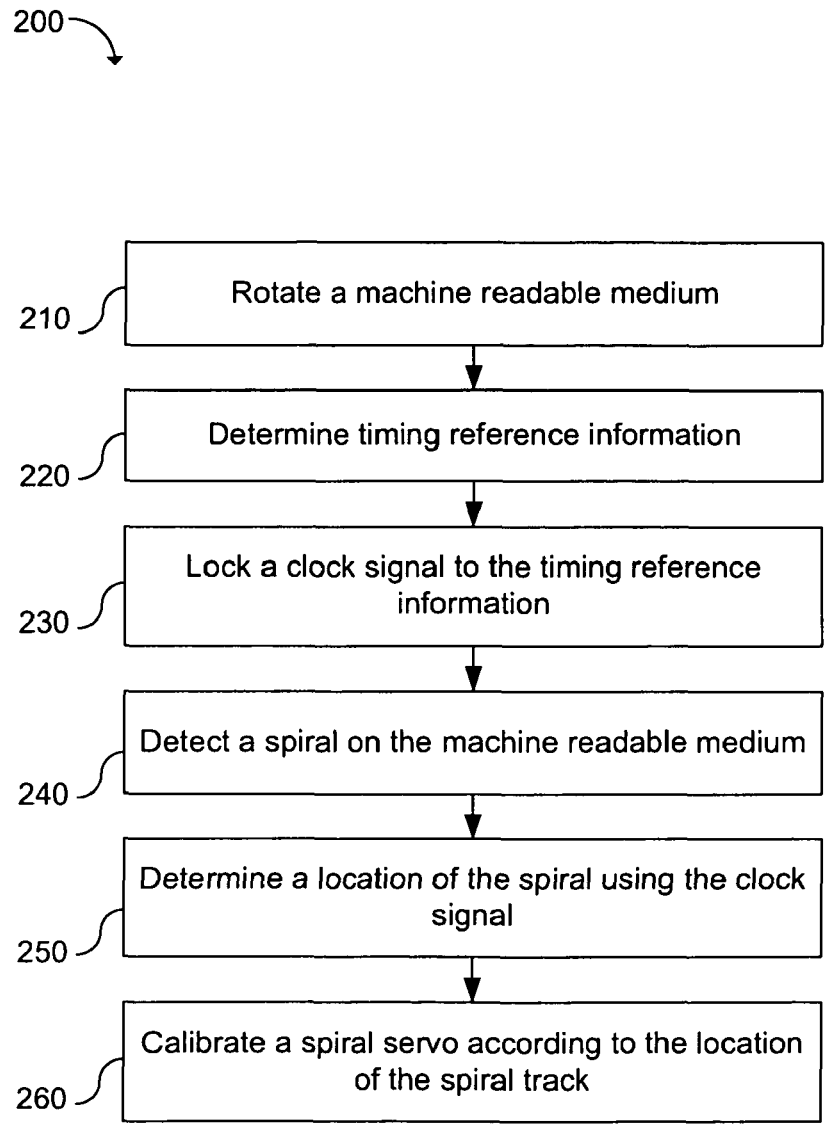
FIG. 2 is a flow chart showing an example process for calibrating a spiral servo.

FIG. 2 is a flow chart showing an example process 200 for calibrating a spiral servo. The process 200 includes rotating 210 a machine readable medium. For example, a machine readable medium can be rotated at a constant angular velocity by a voice coil motor (not shown). Timing reference information is determined 220. For example, the timing reference detector 170 can detect BEMF pulses or timing tracks to be used as timing reference information. A clock signal is locked 230 to the timing reference information. For example, the clock generator 150 can generate a clock signal that is locked to the timing reference information. A spiral on the machine readable medium (e.g., spirals 310 on a machine readable medium 300 of FIG. 3) can be detected 240. For example, the servo track window period generator 165 can generate a servo track window to detect a spiral. The servo track detector 175 can use the servo track window to locate the servo track. The servo track window period generator 165 can include a calibration module (not shown) that calibrates the location of the spiral window. A location of the spiral can be determined 250 using the clock signal. For example, the position generator 155 can determine the position (e.g., radial position, timing position) of the spiral using the clock signal, and a comparison module (not shown) in the servo track detector 175 can determine the relative location of the spiral on the machine readable medium from a location of a seed track, for example. One or more spiral servos can be calibrated 260 according to the location of the spiral. For example, the servo controller 129 (e.g., radial references in a spiral servo, timing references in a spiral servo) can be calibrated 260 according to the location of the spiral. In some implementations, one or more components of the servo controller can be calibrated. For example, the clock generator 150 and position generator 155 can each be calibrated. After spirals have been detected and locations of the spirals have been determined, timing information from the spirals, including times that spiral peaks are detected (e.g., peak times), can be used to control the read/write heads. Control of the heads can be switched from using data from the servo wedges to using data from the spirals. The servo track generator 180 can generate servo tracks that are written to a machine readable medium using the data from the spirals.

Figure 3:
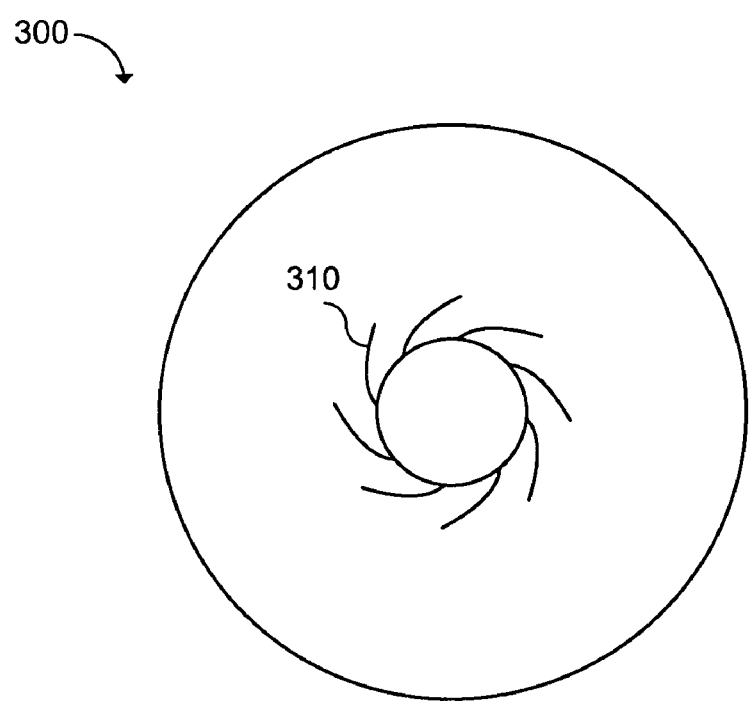
FIG. 3 is a schematic diagram of an example machine readable medium that includes spirals.

FIG. 3 is a schematic diagram of an example machine readable medium 300 that includes spirals 310. The spirals 310 can be written using the same read/write heads of a hard disk drive that are used to read/write data on the machine readable medium 300. The pattern (e.g., spiral) of the tracks can be generated by the servo track pattern generator 160, for example. In some implementations, the servo track pattern generator 160 can generate servo tracks in other patterns (e.g., concentric servo tracks). The spirals 310 can be used to facilitate a SSW process.

Figure 4:
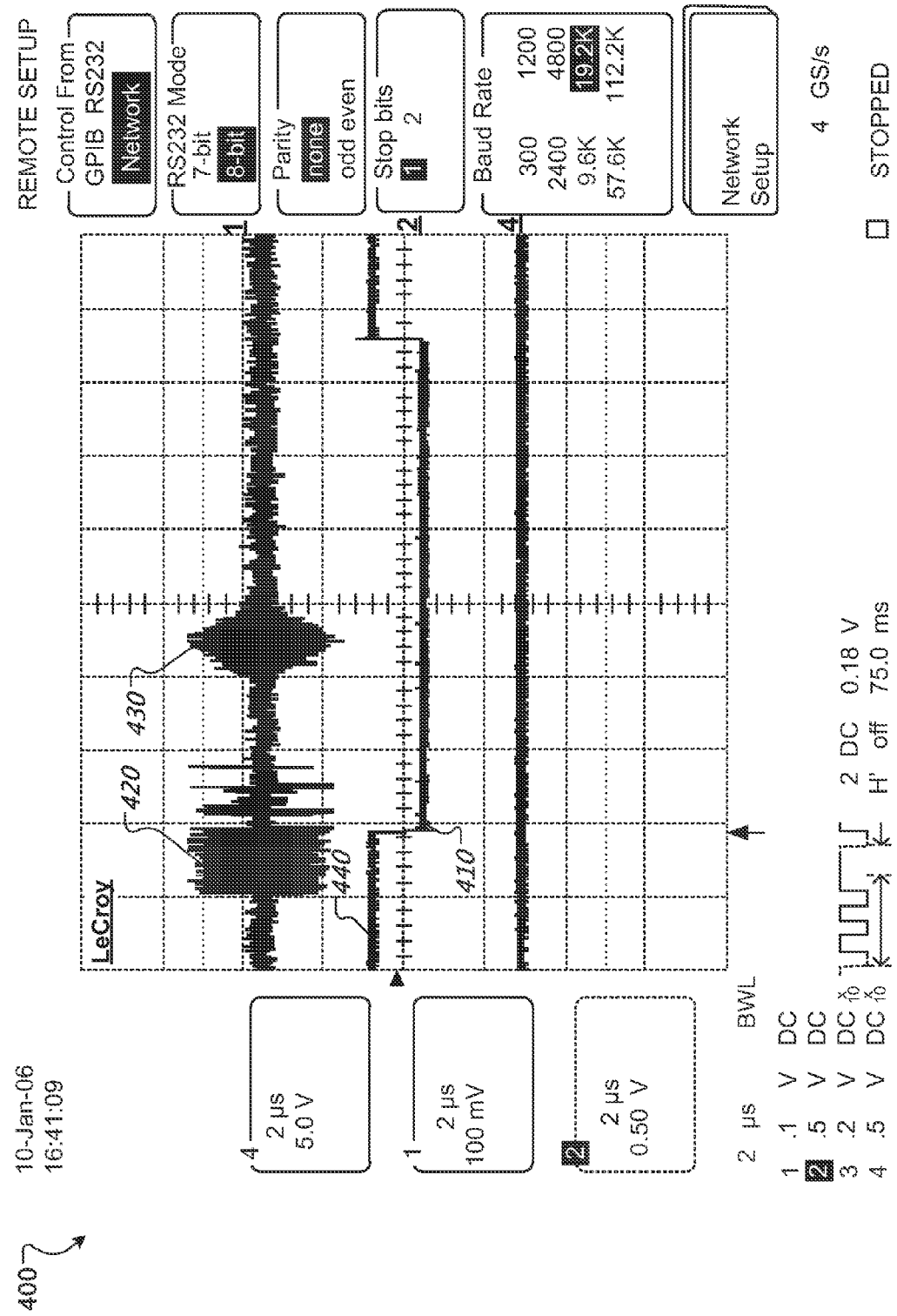
FIG. 4 is a screenshot of an example oscilloscope display that includes a servo interrupt associated with a seed wedge.

FIG. 4 is a screenshot of an example oscilloscope display 400 that includes a servo interrupt 410 associated with a servo wedge 420 (e.g., a writeable control store (WCS) wedge). The oscilloscope display 400 also includes a spiral 430. The servo interrupt 410 is active and can be indicated by a logic "0" in the interrupt status signal 440 (e.g., a low level voltage, such as 0V). In some implementations, the servo interrupts 410 can be interrupt service routines (ISR). For example, the servo interrupts can be hardware or software ISRs. During the servo interrupts (e.g., while the interrupt status signal 440 is low), the heads can read data (e.g., gray code from the servo wedge 420, data from the spiral 430). The data can be used to control the head (e.g., precisely position the head). For example, the position generator 155 can use the data to generate radial position information to control the head.

Figure 5:
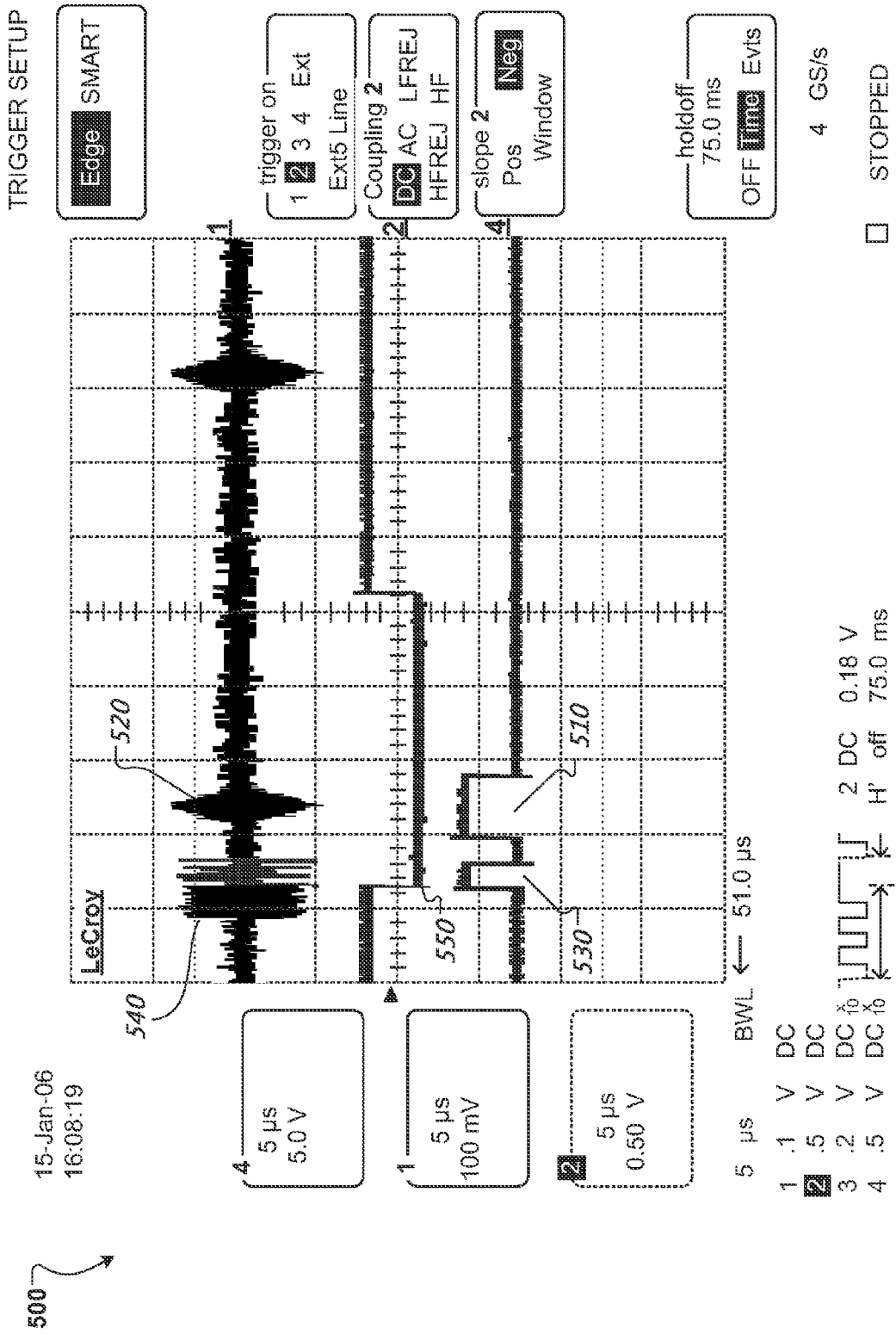
FIG. 5 is a screenshot of an example oscilloscope display that includes a first spiral window.

FIG. 5 is a screenshot of an example oscilloscope display 500 that includes a first spiral window 510. The first spiral window 510 can be generated by the servo track window period generator 165, for example. Once opened, the first spiral window 510 can be used to locate a spiral 520. The period of a spiral window can be defined by a start time and an end time. For example, a spiral window with a start time of one microsecond and a end time of six microseconds has a period of five microseconds. When the spiral 520 is detected in the first spiral window 510, the spiral window 510 can be centered on the spiral 520. For example, the start time (and the end time) of the first spiral window 510 can be adjusted by the calibration module of the servo track window period generator 165 to shift the first spiral window 510 so that the midpoint of the first spiral window 510 is located at a same time as the peak of the spiral 520.

A clock signal (e.g., a SSW clock) can be generated by the clock generator 150. The location of the spirals can be determined by using the clock signal and a spiral window. For example, a timestamp can indicate the location of the spiral 520 at the time the first spiral window 510 is centered on the spiral 520.

In some implementations, a servo track window (e.g., servo wedge window 530) can be generated to detect and locate a servo wedge (e.g., a servo wedge 540). While the servo wedge window 530 is being used to detect the servo wedge 540, the servo interrupt 550 is active (e.g., the interrupt status signal is low) so that data can be collected from the associated servo wedge 540, for example. In addition, the data can be used to control positioning of the heads (e.g., to track the servo wedge 540).

Figure 6:
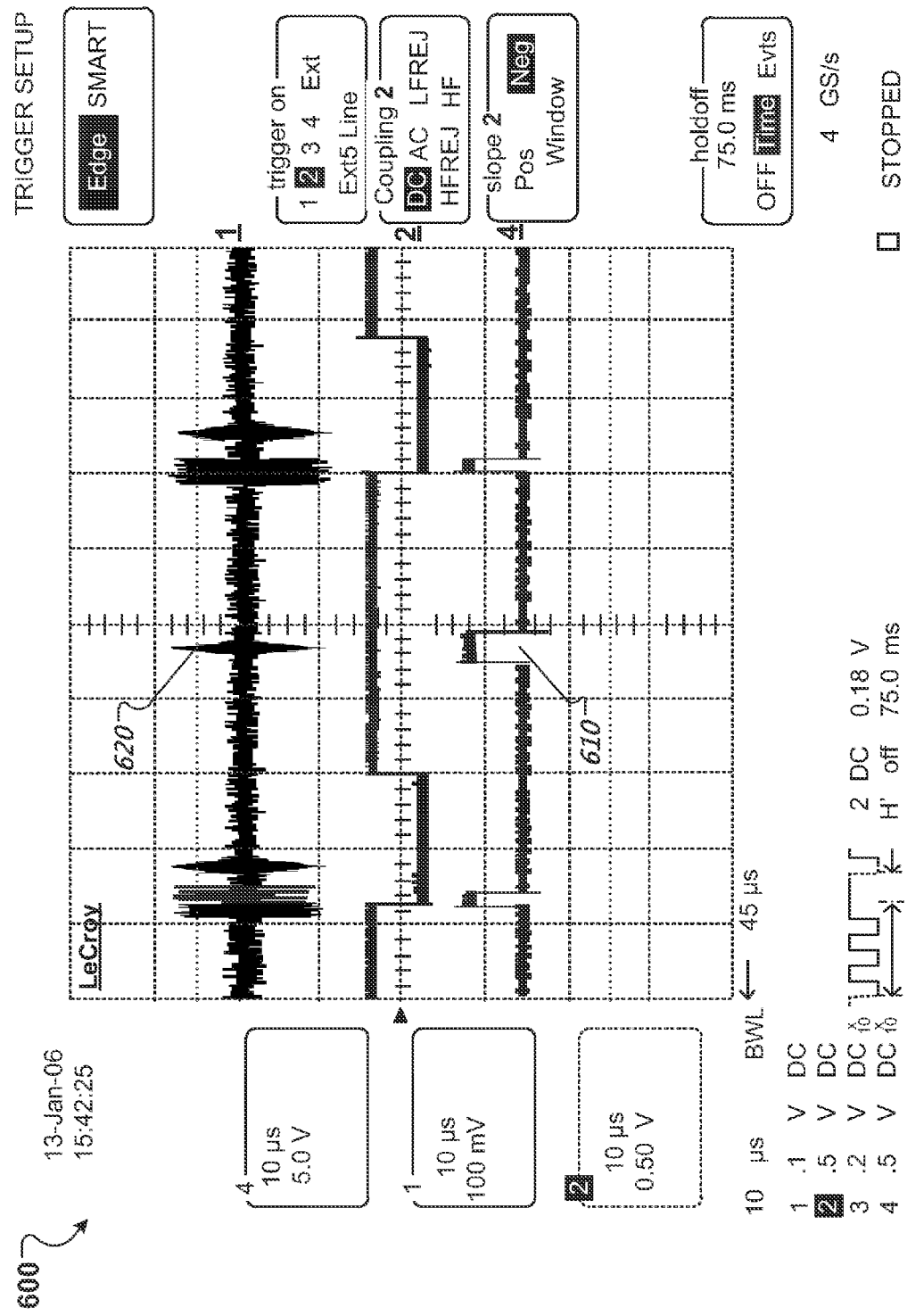
FIG. 6 is a screenshot of an example oscilloscope display that includes a second spiral window.

FIG. 6 is a screenshot of an example oscilloscope display 600 that includes a second spiral window 610. The oscilloscope display 600 also includes a second spiral 620. The second spiral window 610 can be used to detect and locate the second spiral 620.

Figure 7:
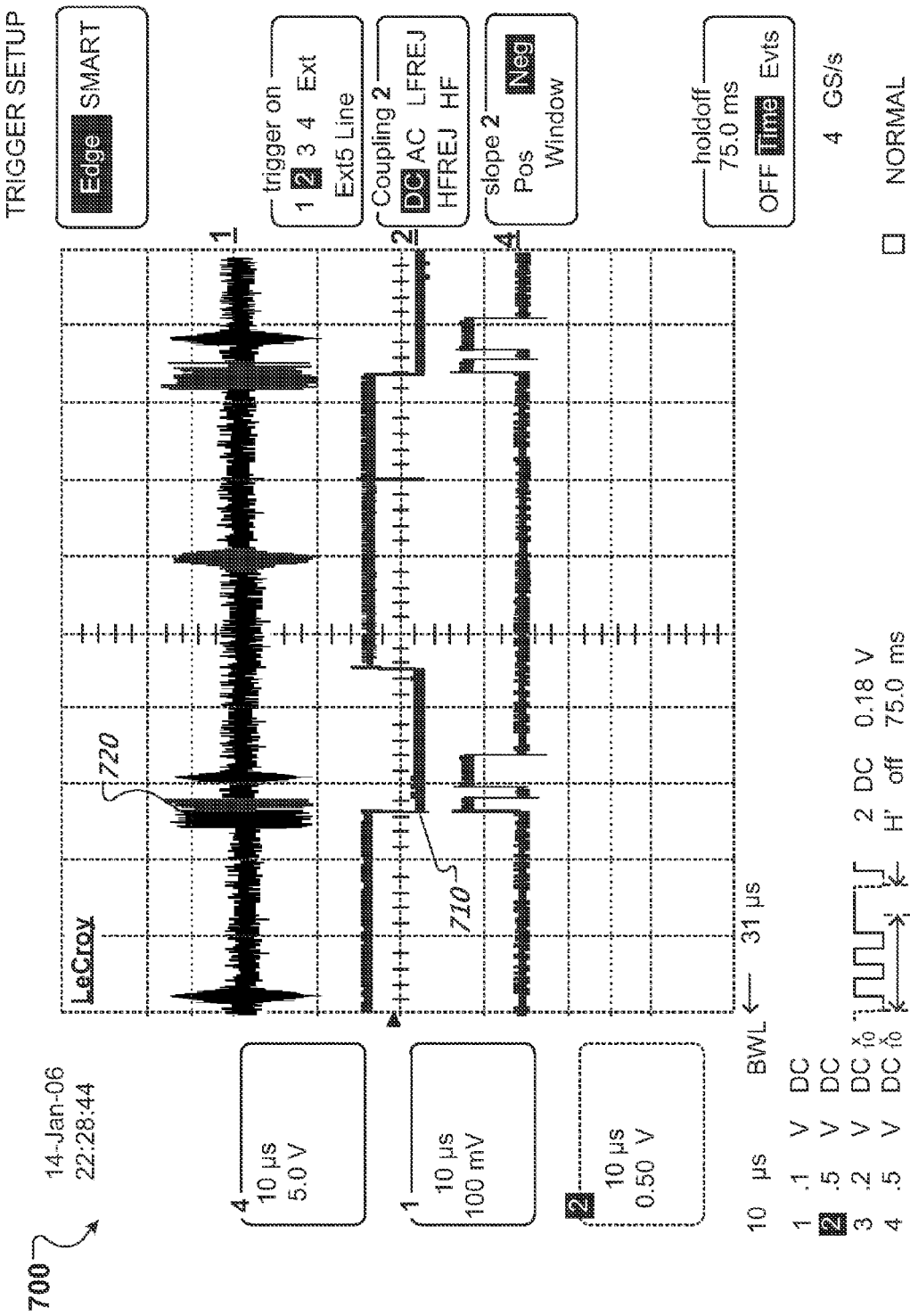
FIG. 7 is a screenshot of an example oscilloscope display that includes the first spiral window.

FIG. 7 is a screenshot of an example oscilloscope display 700 that includes the first spiral window 510. The oscilloscope display 700 shows that the servo interrupt 710 associated with the servo wedge 720 is active, indicating that control of the heads is still using data from the servo wedge 720.

Figure 8:
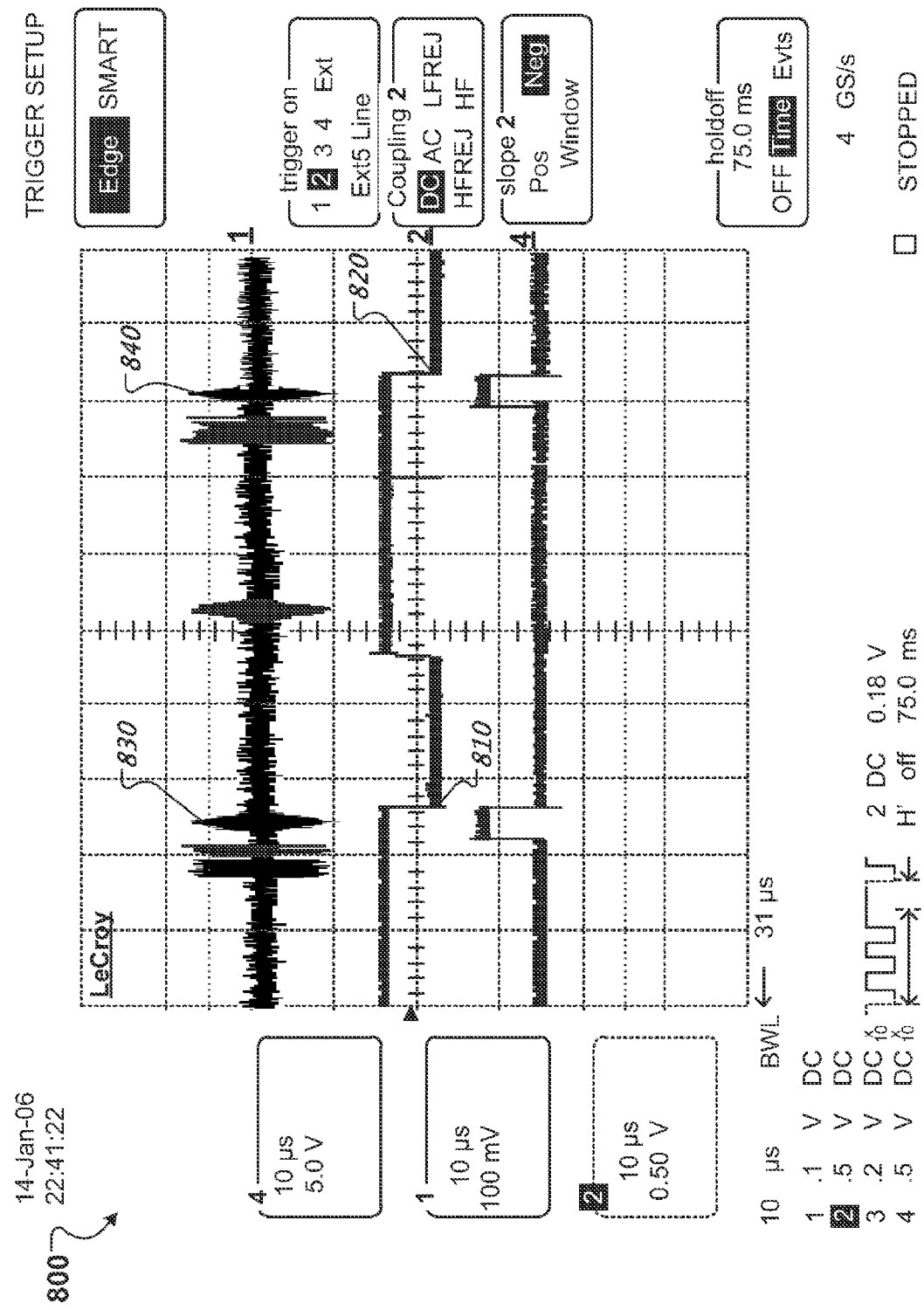
FIG. 8 is a screenshot of an example oscilloscope display that includes servo interrupts associated with spirals.

FIG. 8 is a screenshot of an example oscilloscope display 800 that includes servo interrupts 810 and 820 associated with spirals 830 and 840. After the spirals 830 and 840 have been detected and locations of the spirals 830 and 840 have been determined, timing information from the spirals 830 and 840 can be used to control the read/write heads. Control of the heads can be switched from using data from the servo wedges to using data from the spirals. For example, the servo interrupts 810 and 820 are associated with the spirals 830 and 840, respectively.

Figure 9:
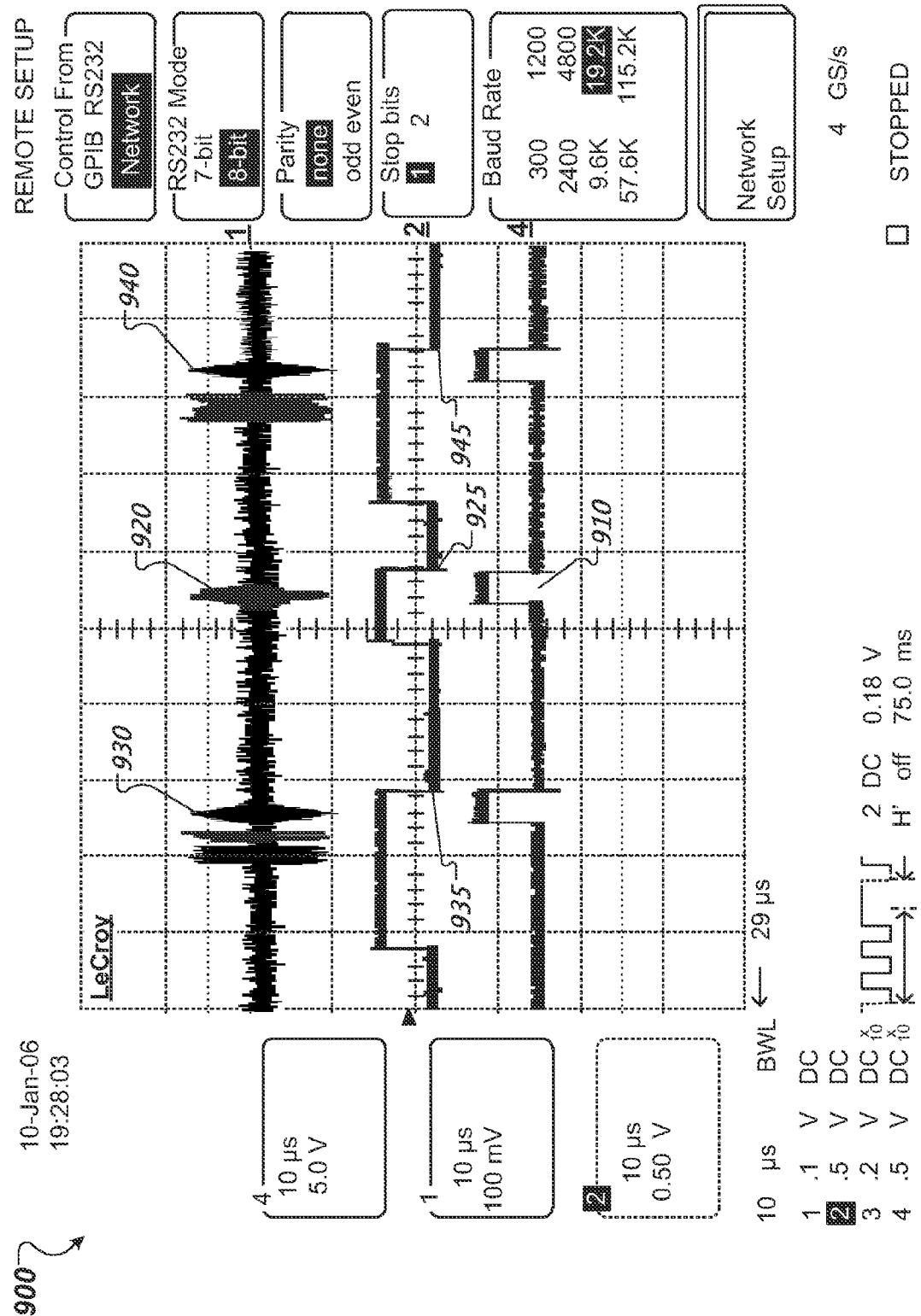
FIG. 9 is a screenshot of an example oscilloscope display corresponding to a calibrated spiral servo.

FIG. 9 is a screenshot of an example oscilloscope display 900 corresponding to a calibrated spiral servo. The oscilloscope display 900 includes a second spiral window 910 centered on a second spiral 920. The oscilloscope display 900 includes servo interrupts 925, 935, and 945 associated with each of the spirals 920, 930 and 940, respectively. Calibration is complete, as the servo interrupts have been synchronized with the spirals.

Figure 10:
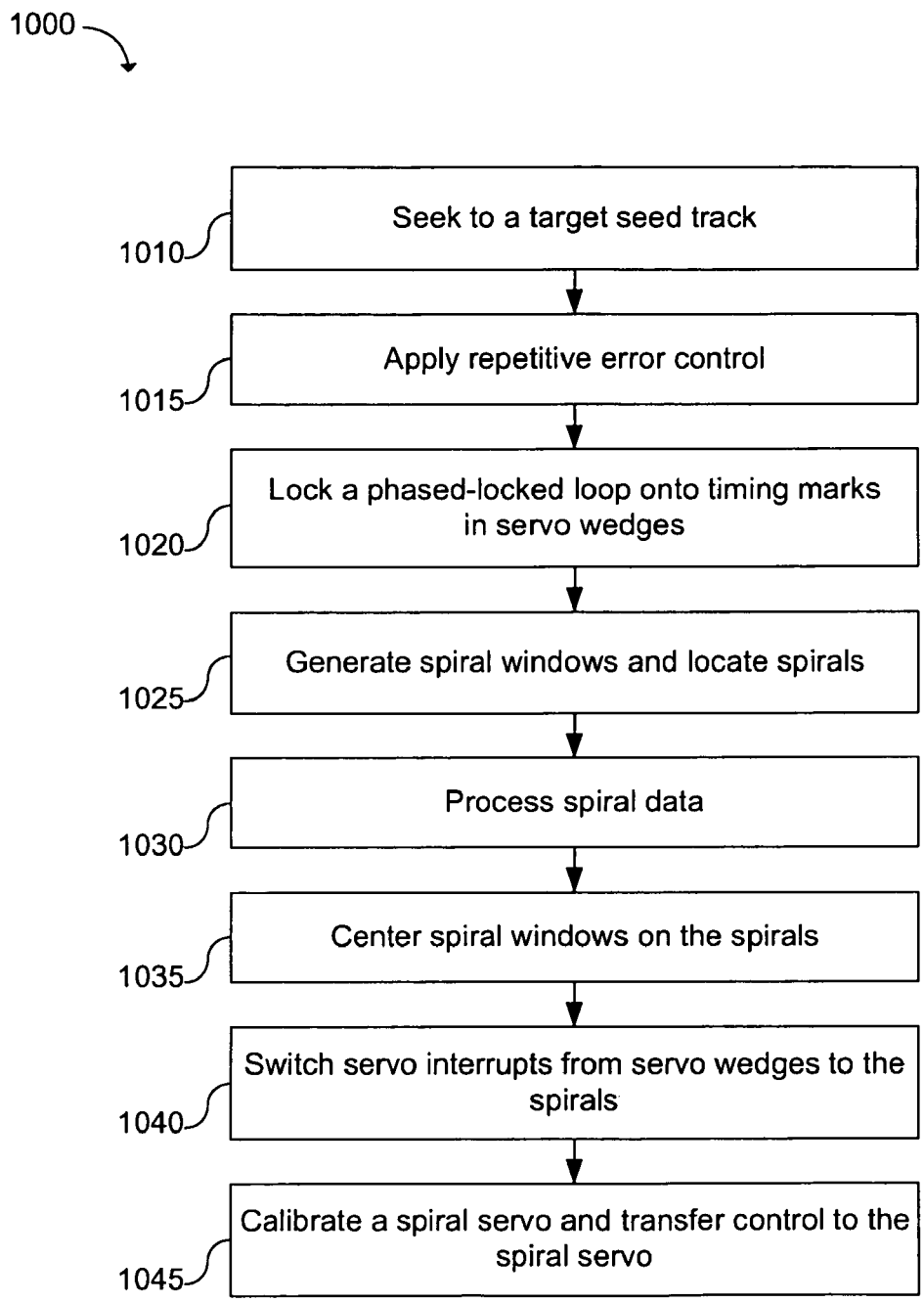
FIG. 10 is a flow chart showing an example process for calibrating a spiral servo using seed tracks.

FIG. 10 is a flow chart showing an example process 1000 for calibrating a spiral servo using seed tracks. As described above, seed tracks can be written on a machine readable medium for use in a SSW process. The process 1000 includes seeking 1010 to a target seed track. For example, the position generator 155 (e.g., a radial position generator) can generate information that can be used to control a read/write head to seek to a target seed track on the machine readable medium 300. In some implementations, repetitive error control (REC) can be applied 1015 to reduce the amount of deviation from radial movement in a perfect circle (e.g., repeatable runout (RRO)). A phased-locked loop (PLL) is locked 1020 onto timing marks in servo wedges (e.g., seed tracks). The timing marks can be used to indicate the location of the servo wedge sync marks. Spiral windows are generated and spirals are located 1025. For example, the servo track window period generator 165 can generate spiral windows to locate spirals. Data from the spirals is processed 1030, and the spiral window is centered 1035 on the spiral. For example, the servo track window period generator 165 can process the data and center the spiral window on the spiral. Servo interrupts are switched 1040 from being associated with the servo wedges to being associated with the spirals, resulting in the heads track following using the spirals instead of the servo wedges. For example, an interrupt control can switch servo interrupts from the servo wedges to the spirals. A spiral servo (e.g., a spiral radial servo) is calibrated and control can be transferred 1045 from a servo wedge servo to the spiral servo. For example, the servo controller 129 can be calibrated and control can be transferred to the servo controller 129 for tracking.

In some implementations, a spiral phase RRO is determined and the PLL is locked on spiral sync marks of the spirals. For example, the servo controller 129 can determine the spiral phase RRO and lock the PLL on the spiral sync marks. In some implementations, PLL REC is applied. The spiral servo can be used to write servo tracks. In some implementations, servo tracks that have been previously written on the machine readable medium are overwritten.

Figures 11A, 11B:
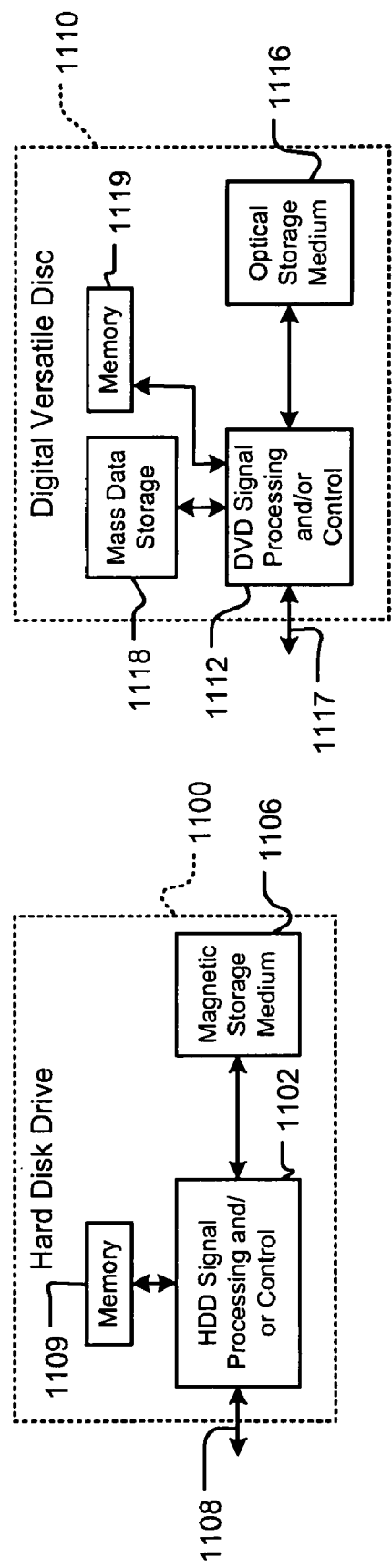

FIGS. 11A-11G show various example implementations of the described systems and techniques. Referring now to FIG. 11A, the described systems and techniques can be implemented in a hard disk drive (HDD) 1100. The described systems and techniques may be implemented in either or both signal processing and/or control circuits, which are generally identified in FIG. 11A at 1102. In some implementations, the signal processing and/or control circuit 1102 and/or other circuits (not shown) in the HDD 1100 may process data, perform coding and/or encryption, perform calculations, and/or format data that is output to and/or received from a magnetic storage medium 1106.

The HDD 1100 may communicate with a host device (not shown) such as a computer, mobile computing devices such as personal digital assistants, cellular phones, media or MP3 players and the like, and/or other devices via one or more wired or wireless communication links 1108. The HDD 1100 may be connected to memory 1109 such as random access memory (RAM), low latency nonvolatile memory such as flash memory, read only memory (ROM) and/or other suitable electronic data storage.

Referring now to FIG. 11B, the described systems and techniques can be implemented in a digital versatile disc (DVD) drive 1110. The described systems and techniques may be implemented in either or both signal processing and/or control circuits, which are generally identified in FIG. 11B at 1112, and/or mass data storage of the DVD drive 1110. The signal processing and/or control circuit 1112 and/or other circuits (not shown) in the DVD drive 1110 may process data, perform coding and/or encryption, perform calculations, and/or format data that is read from and/or data written to an optical storage medium 1116. In some implementations, the signal processing and/or control circuit 1112 and/or other circuits (not shown) in the DVD drive 1110 can also perform other functions such as encoding and/or decoding and/or any other signal processing functions associated with a DVD drive.

The DVD drive 1110 may communicate with an output device (not shown) such as a computer, television or other device via one or more wired or wireless communication links 1117. The DVD drive 1110 may communicate with mass data storage 1118 that stores data in a nonvolatile manner. The mass data storage 1118 may include a hard disk drive (HDD). The HDD may have the configuration shown in FIG. 11A. The HDD may be a mini HDD that includes one or more platters having a diameter that is smaller than approximately 1.8". The DVD drive 1110 may be connected to memory 1119 such as RAM, ROM, low latency nonvolatile memory such as flash memory and/or other suitable electronic data storage.

Referring now to FIG. 11C, the described systems and techniques can be implemented in a high definition television (HDTV) 1120. The described systems and techniques may be implemented in either or both signal processing and/or control circuits, which are generally identified in FIG. 11C at 1122, a WLAN interface and/or mass data storage of the HDTV 1120. The HDTV 1120 receives HDTV input signals in either a wired or wireless format and generates HDTV output signals for a display 1126. In some implementations, signal processing circuit and/or control circuit 1122 and/or other circuits (not shown) of the HDTV 1120 may process data, perform coding and/or encryption, perform calculations, format data and/or perform any other type of HDTV processing that may be required.

The HDTV 1120 may communicate with mass data storage 1127 that stores data in a nonvolatile manner such as optical and/or magnetic storage devices. At least one HDD may have the configuration shown in FIG. 11A and/or at least one DVD drive may have the configuration shown in FIG. 11B. The HDD may be a mini HDD that includes one or more platters having a diameter that is smaller than approximately 1.8". The HDTV 1120 may be connected to memory 1128 such as RAM, ROM, low latency nonvolatile memory such as flash memory and/or other suitable electronic data storage. The HDTV 1120 also may support connections with a WLAN via a WLAN interface 1129.

Referring now to FIG. 11D, the described systems and techniques may be implemented in a control system of a vehicle 1130, a WLAN interface and/or mass data storage of the vehicle control system. In some implementations, the described systems and techniques may be implemented in a powertrain control system 1132 that receives inputs from one or more sensors 1136 such as temperature sensors, pressure sensors, rotational sensors, airflow sensors and/or any other suitable sensors and/or that generates one or more output control signals such as engine operating parameters, transmission operating parameters, braking parameters, and/or other control signals to one or more output devices 1138.

The described systems and techniques may also be implemented in other control systems 1140 of the vehicle 1130. The control system 1140 may likewise receive signals from input sensors 1142 and/or output control signals to one or more output devices 1144. In some implementations, the control system 1140 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

The powertrain control system 1132 may communicate with mass data storage 1146 that stores data in a nonvolatile manner. The mass data storage 1146 may include optical and/or magnetic storage devices for example hard disk drives and/or DVD drives. At least one HDD may have the configuration shown in FIG. 11A and/or at least one DVD drive may have the configuration shown in FIG. 11B. The HDD may be a mini HDD that includes one or more platters having a diameter that is smaller than approximately 1.8". The powertrain control system 1132 may be connected to memory 1147 such as RAM, ROM, low latency nonvolatile memory such as flash memory and/or other suitable electronic data storage. The powertrain control system 1132 also may support connections with a WLAN via a WLAN interface 1148. The control system 1140 may also include mass data storage, memory and/or a WLAN interface (all not shown).

Figure 11E:
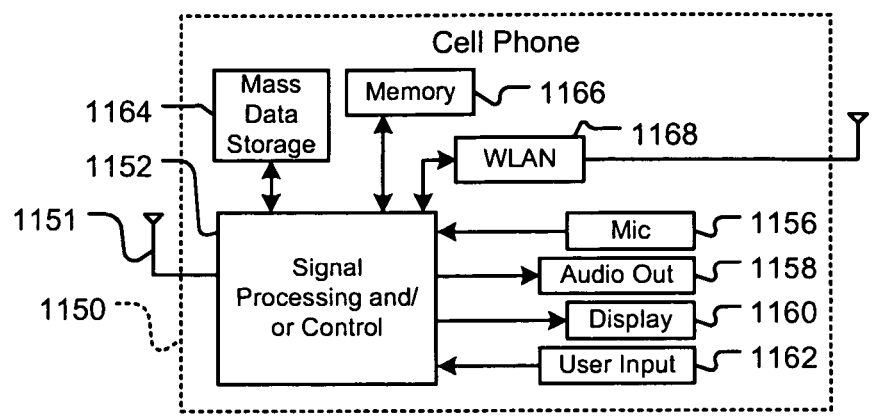

Referring now to FIG. 11E, the described systems and techniques can be implemented in a cellular phone 1150 that may include a cellular antenna 1151. The described systems and techniques may be implemented in either or both signal processing and/or control circuits, which are generally identified in FIG. 11E at 1152, a WLAN interface and/or mass data storage of the cellular phone 1150. In some implementations, the cellular phone 1150 includes a microphone 1156, an audio output 1158 such as a speaker and/or audio output jack, a display 1160 and/or an input device 1162 such as a keypad, pointing device, voice actuation and/or other input device. The signal processing and/or control circuits 1152 and/or other circuits (not shown) in the cellular phone 1150 may process data, perform coding and/or encryption, perform calculations, format data and/or perform other cellular phone functions.

The cellular phone 1150 may communicate with mass data storage 1164 that stores data in a nonvolatile manner such as optical and/or magnetic storage devices for example hard disk drives and/or DVD drives. At least one HDD may have the configuration shown in FIG. 11A and/or at least one DVD drive may have the configuration shown in FIG. 11B. The HDD may be a mini HDD that includes one or more platters having a diameter that is smaller than approximately 1.8". The cellular phone 1150 may be connected to memory 1166 such as RAM, ROM, low latency nonvolatile memory such as flash memory and/or other suitable electronic data storage. The cellular phone 1150 also may support connections with a WLAN via a WLAN interface 1168.

Figure 11F:
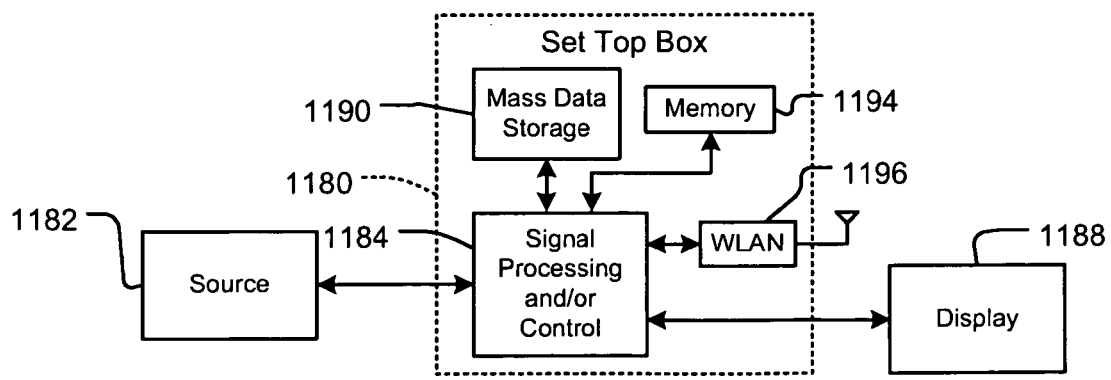

Referring now to FIG. 11F, the described systems and techniques can be implemented in a set top box 1180. The described systems and techniques may be implemented in either or both signal processing and/or control circuits, which are generally identified in FIG. 11F at 1184, a WLAN interface and/or mass data storage of the set top box 1180. The set top box 1180 receives signals from a source 1182 such as a broadband source and outputs standard and/or high definition audio/video signals suitable for a display 1188 such as a television and/or monitor and/or other video and/or audio output devices. The signal processing and/or control circuits 1184 and/or other circuits (not shown) of the set top box 1180 may process data, perform coding and/or encryption, perform calculations, format data and/or perform any other set top box function.

The set top box 1180 may communicate with mass data storage 1190 that stores data in a nonvolatile manner. The mass data storage 1190 may include optical and/or magnetic storage devices for example hard disk drives and/or DVD drives. At least one HDD may have the configuration shown in FIG. 11A and/or at least one DVD drive may have the configuration shown in FIG. 11B. The HDD may be a mini HDD that includes one or more platters having a diameter that is smaller than approximately 1.8". The set top box 1180 may be connected to memory 1194 such as RAM, ROM, low latency nonvolatile memory such as flash memory and/or other suitable electronic data storage. The set top box 1180 also may support connections with a WLAN via a WLAN interface 1196.

Figure 11G:
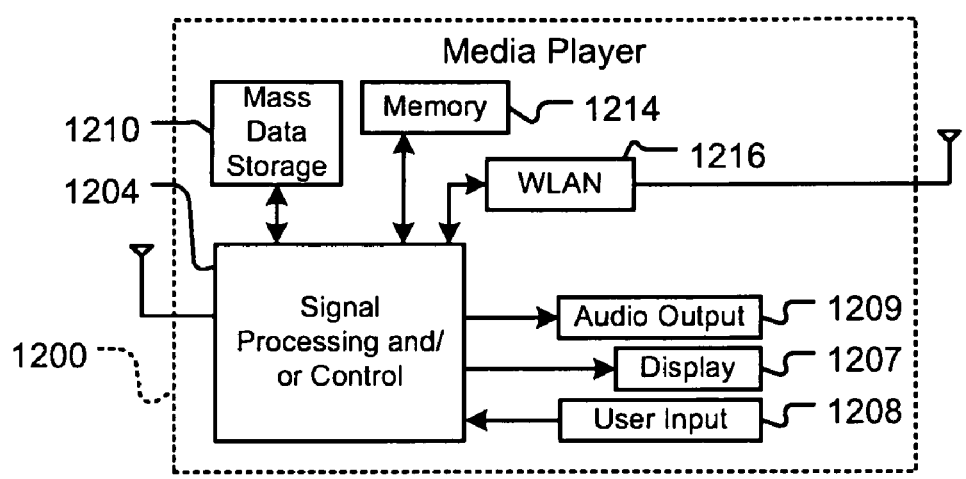

Referring now to FIG. 11G, the described systems and techniques can be implemented in a media player 1200. The described systems and techniques may be implemented in either or both signal processing and/or control circuits, which are generally identified in FIG. 11G at 1204, a WLAN interface and/or mass data storage of the media player 1200. In some implementations, the media player 1200 includes a display 1207 and/or a user input 1208 such as a keypad, touchpad and the like. In some implementations, the media player 1200 may employ a graphical user interface (GUI) that typically employs menus, drop down menus, icons and/or a point-and-click interface via the display 1207 and/or user input 1208. The media player 1200 further includes an audio output 1209 such as a speaker and/or audio output jack. The signal processing and/or control circuits 1204 and/or other circuits (not shown) of the media player 1200 may process data, perform coding and/or encryption, perform calculations, format data and/or perform any other media player function.

The media player 1200 may communicate with mass data storage 1210 that stores data such as compressed audio and/or video content in a nonvolatile manner. In some implementations, the compressed audio files include files that are compliant with MP3 (Moving Picture experts group audio layer 3) format or other suitable compressed audio and/or video formats. The mass data storage may include optical and/or magnetic storage devices for example hard disk drives and/or DVD drives. At least one HDD may have the configuration shown in FIG. 11A and/or at least one DVD drive may have the configuration shown in FIG. 11B. The HDD may be a mini HDD that includes one or more platters having a diameter that is smaller than approximately 1.8". The media player 1200 may be connected to memory 1214 such as RAM, ROM, low latency nonvolatile memory such as flash memory and/or other suitable electronic data storage. The media player 1200 also may support connections with a WLAN via a WLAN interface 1216. Still other implementations in addition to those described above are contemplated.

A few embodiments have been described in detail above, and various modifications are possible. The disclosed subject matter, including the functional operations described in this specification, can be implemented in electronic circuitry, computer hardware, firmware, software, or in combinations of them, such as the structural means disclosed in this specification and structural equivalents thereof, including potentially a program operable to cause one or more data processing apparatus to perform the operations described (such as a program encoded in a computer-readable medium, which can be a memory device, a storage device, a machine-readable storage substrate, or other physical, machine-readable medium, or a combination of one or more of them).

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A program (also known as a computer program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A program can be deployed to be executed on one computer or on multiple computers that are located at one site or distributed across multiple sites and interconnected by a communication network.

While this specification contains many specifics, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

Other embodiments fall within the scope of the following claims.

What is claimed is:

1. An apparatus comprising:
    a timing reference detector that detects a back electromotive force signal associated with a rotating machine readable medium as timing reference information;
    a clock generator that generates a clock signal and locks the clock signal to the timing reference information; and
    a servo track window period generator that generates a spiral window to determine a relative location of a spiral on the machine readable medium based on the timing reference information.

2. The apparatus of claim 1, further comprising:
    a servo track detector that locates the spiral using the spiral window.

3. The apparatus of claim 1, wherein the servo track window period generator includes a calibration module that calibrates a location of the spiral window.

4. The apparatus of claim 1, further comprising:
    a servo track generator that generates servo information using the spiral, the servo information being used to write servo tracks.

5. A method comprising:
    detecting a back electromotive force signal associated with a rotating machine readable medium as timing reference information;
    locking a clock signal to the timing reference information;
    generating a spiral window to detect a spiral on the machine readable medium;
    detecting the spiral on the machine readable medium using the spiral window;
    determining a location of the spiral i) using the spiral window and ii) based in part on the timing reference information; and calibrating a spiral servo according to the location of the spiral.

6. The method of claim 5, further comprising:
switching control for tracking from a servo wedge servo to the spiral servo.

7. The method of claim 6, further comprising:
writing servo tracks using the spiral servo.

8. A system comprising:
a machine readable medium; and
a servo controller including:
- a timing reference detector that detects a back electromotive force signal associated with a rotating machine readable medium as timing reference information;
- a clock generator that generates a clock signal and locks the clock signal to the timing reference information; and
- a servo track window period generator that generates a spiral window to determine a relative location of a spiral on the machine readable medium based on the timing reference information.

9. The system of claim 8, wherein the servo controller further includes:
a servo track detector that locates the spiral using the spiral window.

10. The system of claim 8, wherein the servo track window period generator includes a calibration module that calibrates a location of the spiral window.

11. The system of claim 8, wherein the servo controller further includes:
a servo track generator that generates servo information using the spiral, the servo information being used to write servo tracks.

12. An apparatus comprising:
means for detecting a back electromotive force signal associated with a rotating machine readable medium as timing reference information;
means for generating a clock signal and for locking the clock signal to the timing reference information; and
means for generating a spiral window to determine a relative location of a spiral on the machine readable medium based on the timing reference information.

13. The apparatus of claim 12, further comprising:
means for locating the spiral using the spiral window.

14. The apparatus of claim 12, wherein the means for generating a spiral window includes means for calibrating a location of the spiral window.

15. The apparatus of claim 12, further comprising:
means for generating servo information using the spiral, the servo information being used to write servo tracks.

* * * * *